US009874921B2

(12) United States Patent
Wang (10) Patent No.: US 9,874,921 B2
(45) Date of Patent: Jan. 23, 2018

(54) INTELLIGENT SWITCH CAPACITOR (71) Applicant: GYRK INTERNATIONAL TECHNOLOGY CO., LTD., Beijing (CN)

(72) Inventor: Hai Wang, Beijing (CN)

(73) Assignee: GYRK INTERNATIONAL TECHNOLOGY CO., LTD. (CN)

( * ) Notice: Subject to any disclaimer, the term of this patent is extended or adjusted under 35 U.S.C. 154(b) by 263 days.

(21) Appl. No.: 14/769,380

(22) PCT Filed: Feb. 21, 2014

(86) PCT No.: PCT/CN2014/072349
§ 371 (c)(1),
(2) Date: Aug. 20, 2015

(87) PCT Pub. No.: WO2014/127728
PCT Pub. Date: Aug. 28, 2014

(65) Prior Publication Data
US 2015/0378416 A1    Dec. 31, 2015

(30) Foreign Application Priority Data

Feb. 22, 2013 (CN) .................... 2013 2 0081778 U (51) Int. Cl.
*H01G 4/40* (2006.01)
*G06F 1/32* (2006.01)
(Continued)

(52) U.S. Cl.
CPC .................. *G06F 1/32* (2013.01); *H01G 2/18* (2013.01); *H01G 4/38* (2013.01); *H01G 4/40* (2013.01); *H02J 3/18* (2013.01); *Y02E 40/30* (2013.01)

(58) Field of Classification Search
CPC ..................................... Y02E 40/30
See application file for complete search history.

(56) References Cited

U.S. PATENT DOCUMENTS 7,768,215 B1 * 8/2010 Shiwei ............... H05B 41/2822
315/224
2002/0196112 A1 * 12/2002 Ruan .................. G02B 26/0841
335/78
(Continued)

FOREIGN PATENT DOCUMENTS

CN    201611781    10/2010
CN    102013686    4/2011
(Continued)

OTHER PUBLICATIONS

International Search Report for PCT Application PCT/CN2014/072349 dated May 19, 2014 (4 pages).
(Continued)

*Primary Examiner* — Xanthia C Cunningham
(74) *Attorney, Agent, or Firm* — Barnes & Thornburg LLP; Jeffrey R. Stone (57) ABSTRACT

The present invention relates to an intelligent switch capacitor, which comprises a shell. The shell is provided with a capacitor core internally. A temperature sensor is arranged on the capacitor core. A top end of the capacitor core is connected to an intelligent switch wiring board. The intelligent switch wiring board is connected to a single chip computer, a capacity-switch, a temperature measurement module, a current measurement module and a current harmonic component measurement module, wherein the capacitor switch is connected to the capacitor core in an inner triangle way. Beneficial effects of the present invention are: 1. A switch and a power capacitor are integrated into a whole, which can implement quick capacity-switching and cutting of the switch; 2. The capacitor has an electronic thermal protection function; 3. Possibilities of capacitor damages and power grid accidents caused by resonance of a (Continued)

PFC capacitor in a power grid system are eliminated completely; 4. A power capacitor loss is reduced.

11 Claims, 7 Drawing Sheets

(51) Int. Cl.
*H01G 2/18* (2006.01)
*H02J 3/18* (2006.01)
*H01G 4/38* (2006.01)

(56) References Cited

U.S. PATENT DOCUMENTS

2003/0090918 A1* 5/2003 Shenai .................. G06F 1/3203
363/127

2015/0207426 A1* 7/2015 Santini .................. H02M 7/217
363/126

FOREIGN PATENT DOCUMENTS

| CN | 202050248 | 11/2011 |
| CN | 102299519 | 12/2011 |
| CN | 202276153 | 6/2012 |
| CN | 203103979 | 7/2013 |
| JP | 2012050290 | 3/2012 |

OTHER PUBLICATIONS

Supplementary European Search Report for EP 14 75 3712 dated Sep. 15, 2016 (7 pages).

* cited by examiner

INTELLIGENT SWITCH CAPACITOR

TECHNICAL FIELD

The present invention relates to an assembly of a capacitor switch and a low-voltage alternating current capacitor, and more particularly to a power capacitor used for low-voltage power grid compensation or filtering and provided with an intelligent switch therein.

BACKGROUND

A power capacitor is a circuit element that must be used in power system compensation and filtering. During compensation or filtering of a power grid, the power capacitor is connected or disconnected through a capacitor switch, or the capacitor switch and the power capacitor are always used in combination. However, the conventional power capacitor and capacitor switch are produced in two different industries, and the power sector needs to separately purchase the two products and assemble them on equipment prior to use. Because power capacitors of different sizes require different switches, matching of different power capacitors with suitable capacitor switches must be considered in use. High-order harmonics in the power grid generate resonance under specific conditions to, cause damage of the capacitor, and in order to avoid the resonance caused by the high-order harmonics, a reactor is generally connected in series in the capacitor circuit to prevent damage of the capacitor. In practice, the series-connected reactor can only solve part of the problem of high-order harmonic resonance, and cannot solve the resonance problem fundamentally, and even with the reactor, burnout of the power capacitor also occurs due to high-order resonance. The conventional capacitor switch is a contactor-type capacitor switch, and such a switch has large power consumption generally around 15 W. The conventional combination of the power capacitor and the switch is a combination of a three-phase power capacitor and a three-phase switch. When the capacitor is disconnected through the switch, the residual voltage of one phase of capacitor always reaches 1.36 times the peak supply voltage, and the capacitor must be discharged before being connected again, so that such combination of the switch and the capacitor cannot achieve rapid capacitor switching. In addition, a discharge resistor must be installed inside the conventional power capacitor as required by safety specifications, but the discharge resistor produces large power consumption. The power consumption of the power grid caused by the discharge resistor exceeds 100 million kilowatts per year (merely according to the calculation of State Grid).

The conventional power capacitor generally adopts a mechanical thermal expansion snap-type explosion-proof mechanism in order to prevent explosion due to overheating of the capacitor. Such explosion-proof mechanism starts cutting off the capacitor when the capacitor is overheated. However, the explosion-proof mechanism is unrecoverable, and the capacitor can no longer be used once the explosion-proof mechanism operates. That is, the power capacitor that should not fail fails under some unexpected overheating conditions. Besides, such mechanical explosion-proof mechanism has high requirements on sealing of the capacitor, and the thermal expansion explosion-proof mechanism does not operate upon leakage. Further, such explosion-proof mechanism has low response speed, and cannot respond quickly to protect the capacitor when resonance occurs in the capacitor circuit.

There is also an intelligent capacitor as disclosed in Chinese Patent No. ZL200620071465.7 now on the market. In this intelligent capacitor, a three-phase capacitor and a capacitor switch are simply combined, instead of designing the power capacitor and the capacitor switch as a whole product, with the mere effect that a user does not need to worry about selecting matching switches for different capacitors and the capacitor switch and the capacitor do not need to be connected during installation. However, such intelligent capacitor still cannot effectively solve the problems of protection against capacitor heating, harmonic protection, power consumption of the capacitor switch, and rapid capacitor switching.

An external temperature protection and overcurrent and overvoltage protection device used in practice can also protect the capacitor from damage when the power capacitor is overheated or subjected to an overcurrent or overvoltage. However, the external protection device is rarely used because of the cost and mainly because the external protection device cannot detect the actual operating status in a capacitor core. The external protection device makes little sense as it cannot achieve accurate and rapid protection.

Now the capacity of general three-phase power capacitors is over 30 kvar. Due to the cost of a small-capacity power capacitor and the cost of a capacitor switch, conventional reactive compensation devices using power capacitors and having power lower than 30 kvar generally cannot achieve graded compensation, while reactive compensation devices with high power cannot achieve fine compensation.

In view of the above, the power capacitor operates in a poor power grid environment due to the presence of a large amount of harmonics. Because there is no effective, reliable and low-cost way of protecting the power capacitor, the protection of the low-voltage power capacitor remains to be a tough problem.

SUMMARY OF THE INVENTION

Technical Problems

The objective of the present invention is to provide a low-voltage intelligent switch capacitor having a capacitor switch and multiple protection devices, in which the capacitor switch, a power capacitor and overheating, overcurrent and overvoltage protection devices are integrated and designed as a whole to achieve an optimal combination of various parts so as to overcome the aforementioned deficiencies in the prior art. The present invention further provides an intelligent switch capacitor with multiple capacity outputs that can be used in reactive compensation devices with low reactive power and used in reactive compensation devices with high power to achieve fine compensation.

Technical Solutions

The objective of the present invention is achieved through the following technical solution.

An intelligent switch capacitor includes a housing, in which a capacitor core is disposed inside the housing, a top end of the capacitor core is connected to an intelligent switch circuit board, the intelligent switch circuit board is connected to a single-chip microcomputer and a capacitor switch, and the capacitor switch is in internal triangle connection with the capacitor core; a leading-out terminal for connecting to a three-phase power line and a control interface for controlling the switch are disposed in the middle of a top end of the housing, a bottom of the control interface is connected to the intelligent switch circuit board, and a wire fastening device is disposed inside the leading-out terminal of the three-phase power line. The intelligent switch capacitor is essentially a capacitor with a capacitor switch. Designing and manufacturing the capacitor and the capacitor switch as an integral product is totally different from installing the capacitor switch on the capacitor.

Furthermore, a temperature sensor is disposed on the capacitor core, the temperature sensor is used for detecting a temperature of the capacitor core, a detected temperature signal is transmitted to the single-chip microcomputer for processing, and the capacitor is protected through the capacitor switch.

Furthermore, a temperature sensor is disposed on the leading-out terminal of the three-phase power line, the temperature sensor is used for detecting a temperature of the leading-out terminal, a detected temperature signal is transmitted to the single-chip microcomputer for processing, and when the leading-out terminal is in poor contact with a power bus and produces heat, the lead terminal is protected by cutting off the capacitor switch.

Furthermore, a current measurement module and a current harmonic component measurement module are disposed on the intelligent switch circuit board, the current measurement module and the current harmonic component are used for detecting a current passing through the capacitor after the capacitor switch is closed, a detected current signal is transmitted to the single-chip microcomputer for processing, and the capacitor is protected through the capacitor switch.

Furthermore, a power module is disposed on the intelligent switch circuit board, and the power module is preferably a capacitive buck rectifier power supply.

Preferably, the capacitor switch is a magnetic latching relay.

Preferably, the wire fastening device is a wire fastening nut or a wire fastening pressing plate.

Preferably, the housing is cube-shaped or cylinder-shaped.

Preferably, the capacitor core inside the cylindrical intelligent switch capacitor is seven cores with the same diameter arranged in a hexagon, and the seven cores generate 1:2:4 capacities.

Beneficial Effects

The beneficial effects of the present invention are that: 1. the capacitor switch and the power capacitor are matched and designed in an optimal way, and the switch and the power capacitor are integrated, so that the fault rate can be greatly reduced and meanwhile rapid capacitor switching of the power capacitor can be achieved; 2. the capacitor has an electronic thermal protection function, and such overheating protection function, based on a thermistor installed on the capacitor core, has characteristics of precise protection temperature and high protection speed with the protection temperature being adjustable, in which the function of delayed protection and non-destructive protection cannot be achieved by conventional mechanical protection devices; 3. the harmonic current can be detected accurately and rapidly by means of the harmonic current detection and protection function, so that the hidden trouble of capacitor damage and power grid accidents caused by resonance of a power factor correction (PFC) power capacitor in a power grid system are completely eliminated; and 4. a discharge resistor connected in parallel to the capacitor is removed, so that the loss of the power capacitor is minimized while safe use of the capacitor is ensured.

BRIEF DESCRIPTION OF THE DRAWINGS

The present invention is described in further detail below according to accompanying drawings.

FIG. 6 is an internal structural view of a cylindrical intelligent switch capacitor with multiple capacity outputs according to an embodiment of the present invention;

In the drawings:
1. housing; 2. capacitor core; 3. intelligent switch circuit board; 4. single-chip microcomputer; 5. capacitor switch; 5-1, 5-2, 5-3, 5-11, 5-12, 5-13, 5-21, 5-22, 5-23, 5-31, 5-32, 5-33. relay; 6. leading-out terminal of three-phase power line and wire fastening device; 7. control interface; 8. temperature sensor; 9. temperature measurement module; 10. current measurement module; 11. current harmonic component measurement module; 12. capacitive buck rectifier power supply.

DETAILED DESCRIPTION OF THE EMBODIMENTS

Figure 1:
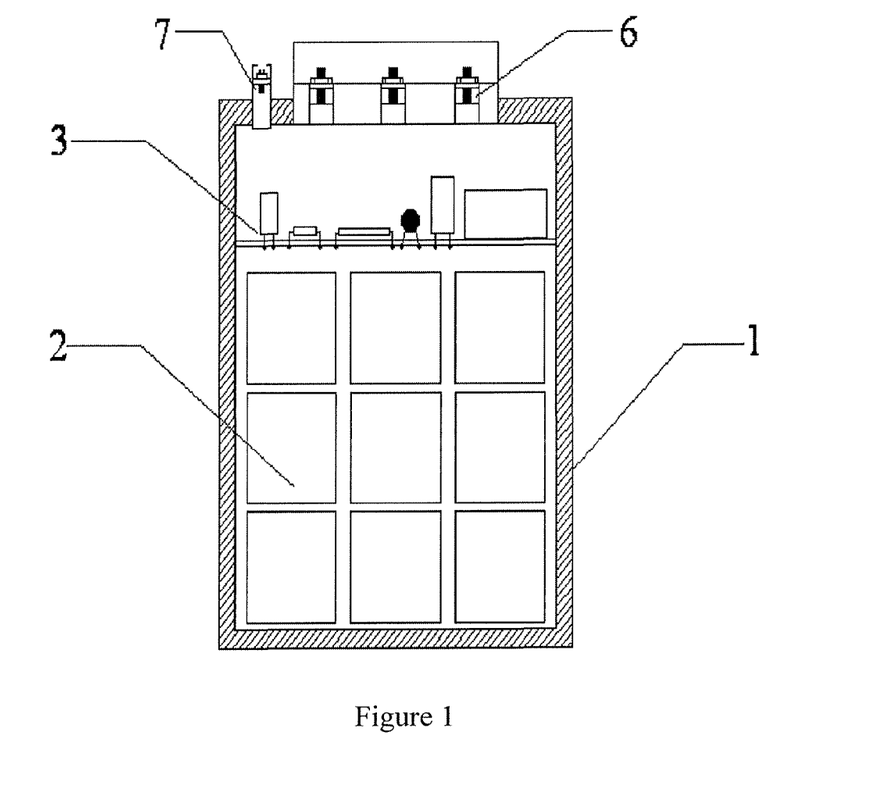
FIG. 1 is a partial structural sectional view of an intelligent switch capacitor according to an embodiment of the present invention.
Figure 2:
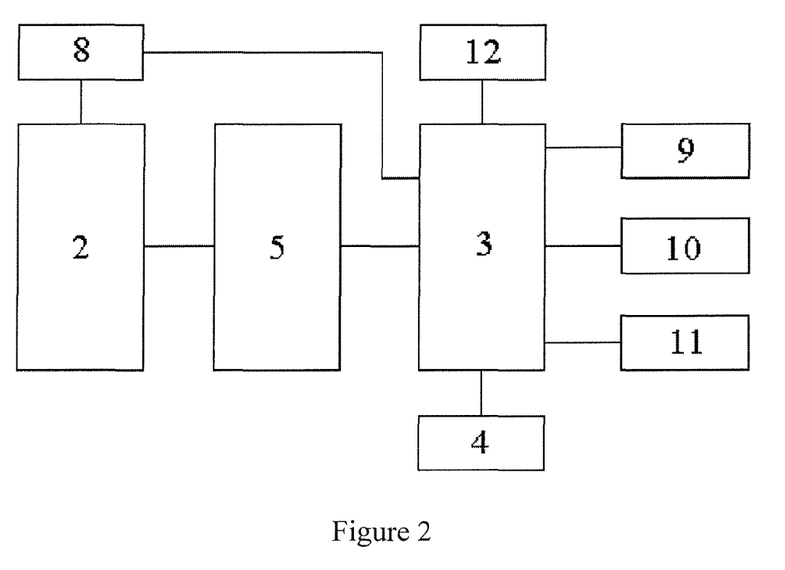
FIG. 2 is a schematic circuit block diagram of the intelligent switch capacitor according to the embodiment of the present invention.

As shown in FIG. 1 and FIG. 2, an intelligent switch capacitor according to an embodiment of the present invention includes a housing 1. A capacitor core 2 is disposed inside the housing 1. An intelligent switch circuit board 3 is placed on a top end of the capacitor core 2. The intelligent switch circuit board 3 is connected to a single-chip microcomputer 4, a capacitor switch 5, a temperature measurement module 9, a current measurement module 10, and a current harmonic component measurement module 11. The capacitor switch 5 is composed of three switches in internal triangle connection with the capacitor core 2. A leading-out terminal 6 of a three-phase power line and a control interface 7 for controlling the switch are disposed in the middle of a top end of the housing 1. A bottom of the control interface 7 is connected to the intelligent switch circuit board 3. A wire fastening device is disposed inside the leading-out terminal of the three-phase power line. The wire fastening device is a wire fastening nut or a wire fastening pressing plate. Low-voltage compensation power capacitors generally need a sealed structure due to moisture-proof and insulation requirements, so there is high requirement on the reliability of the capacitor switch installed inside the sealed housing. A capacitor switch disclosed in Chinese Patent Application 201310265141.1 can be used in the intelligent switch capacitor of the present invention. Such switch has not only high reliability but also low overall power consumption, and thus can perfectly meet the strict requirement on heat production of the capacitor switch control circuit of the intelligent switch capacitor. A temperature sensor 8 is disposed on the capacitor core 2, and the temperature sensor may be placed inside a spindle of the capacitor core or on the surface of the capacitor core. Because a temperature processing circuit is inside the housing of the capacitor and even every capacitor core may be provided with a temperature sensor, and the capacitor is damaged generally as a certain weak capacitor core is overheated and damaged first, the operating status of the capacitor can be acquired more accurately and rapidly by disposing the temperature sensor on the capacitor core, so as to achieve accurate and rapid protection.

A large current passes through the capacitor during operation of the compensation capacitor, and if the lead terminal of the capacitor is not tightened in installation or the terminal of the capacitor is oxidized during use, the terminal of the compensation capacitor produces intense heat during operation, which is the cause of an early failure of the compensation capacitor. In the intelligent switch capacitor of the present invention, the temperature sensor may be installed near the leading-out terminal 6 of the three-phase power line, and if an excessively high temperature of the lead terminal 6 is detected, the switch may be cut off so that the intelligent switch capacitor stops operation, thereby preventing damage of the capacitor caused by overheating of the lead terminal.

Figure 3:
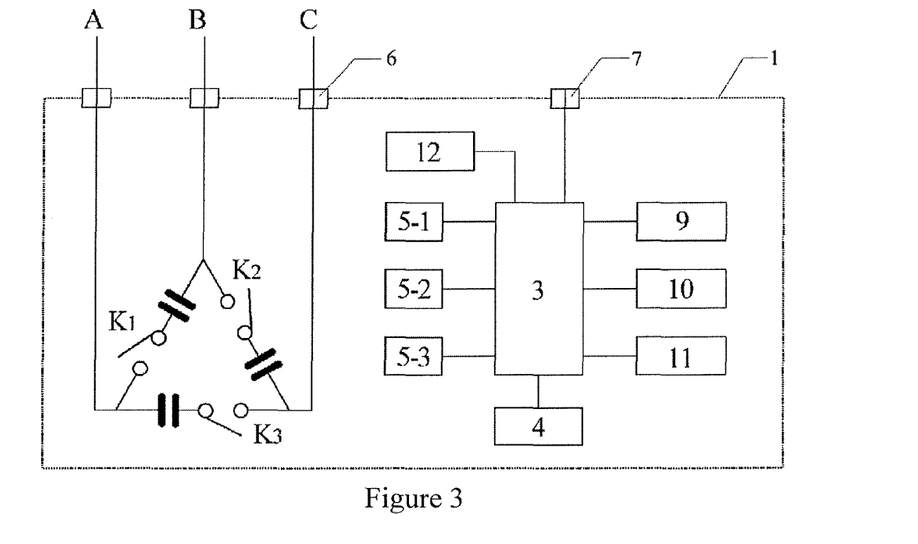
FIG. 3 is a schematic circuit block diagram of a three-phase common compensation intelligent switch capacitor according to an embodiment of the present invention.

The circuit shown in FIG. 3 is a schematic block diagram of a three-phase common compensation intelligent switch capacitor according to an embodiment of the present invention. The capacitor switch 5 is three independent relays 5-1, 5-2, and 5-3 that respectively control switches K1, K2, and K3. The switches K1, K2, and K3 are in intra-angle connection with three groups of capacitor cores, that is, each switch is connected to one capacitor core. The intelligent switch circuit board 3 controls the action time of each capacitor switch contact, so as to achieve surge-free capacitor switching of the alternating current capacitor. Besides, such structure in which the switch and the capacitor are connected may also control capacitor switching of a single one or two of the switches K1, K2, and K3, that is, achieving separate phase compensation.

Figure 4:
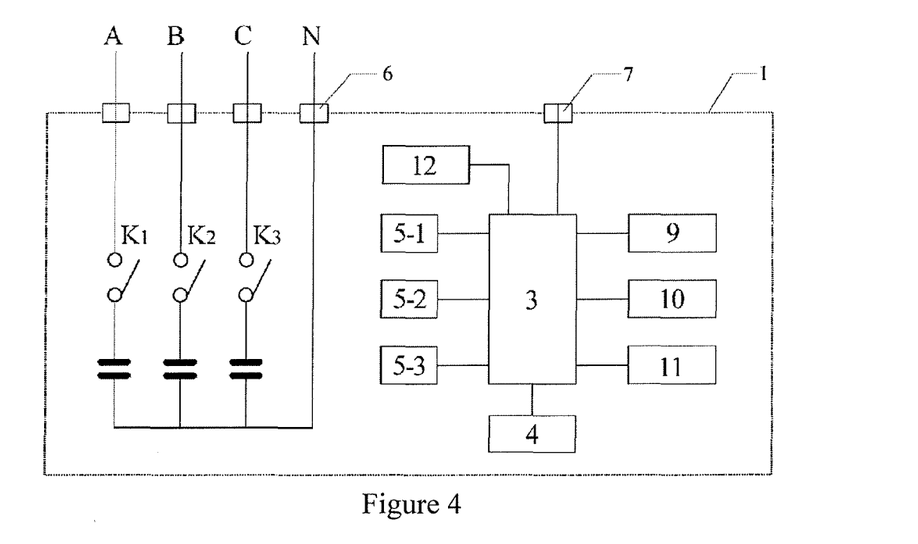
FIG. 4 is a schematic circuit block diagram of a three-phase separate compensation intelligent switch capacitor according to an embodiment of the present invention.

The intelligent switch capacitor of the present invention may also be made into a structure used for star circuit compensation. In this case, the intelligent switch capacitor adopts four terminals A/B/C/N for leading out, and the schematic circuit block diagram is shown in FIG. 4. Similarly, relays 5-1, 5-2, and 5-3 respectively control switches K1, K2, and K3, the switches K1, K2, and K3 form star connection with three groups of capacitor cores, and the intelligent switch circuit board 3 controls the action time of each capacitor switch contact, so as to achieve surge-free capacitor switching of the alternating current capacitor. Similarly, if capacitor switching of a single one or two of the switches K1, K2, and K3 is controlled, separate phase compensation is achieved for the star circuit.

It can be seen from the embodiments shown in FIG. 3 and FIG. 4 that, the intelligent switch capacitor, either of a triangle structure or of a star structure, of the present invention can easily achieve capacitance output with common compensation and separate compensation, which is difficult for a conventional structure in which a capacitor switch and a capacitor are separated.

Figure 5:
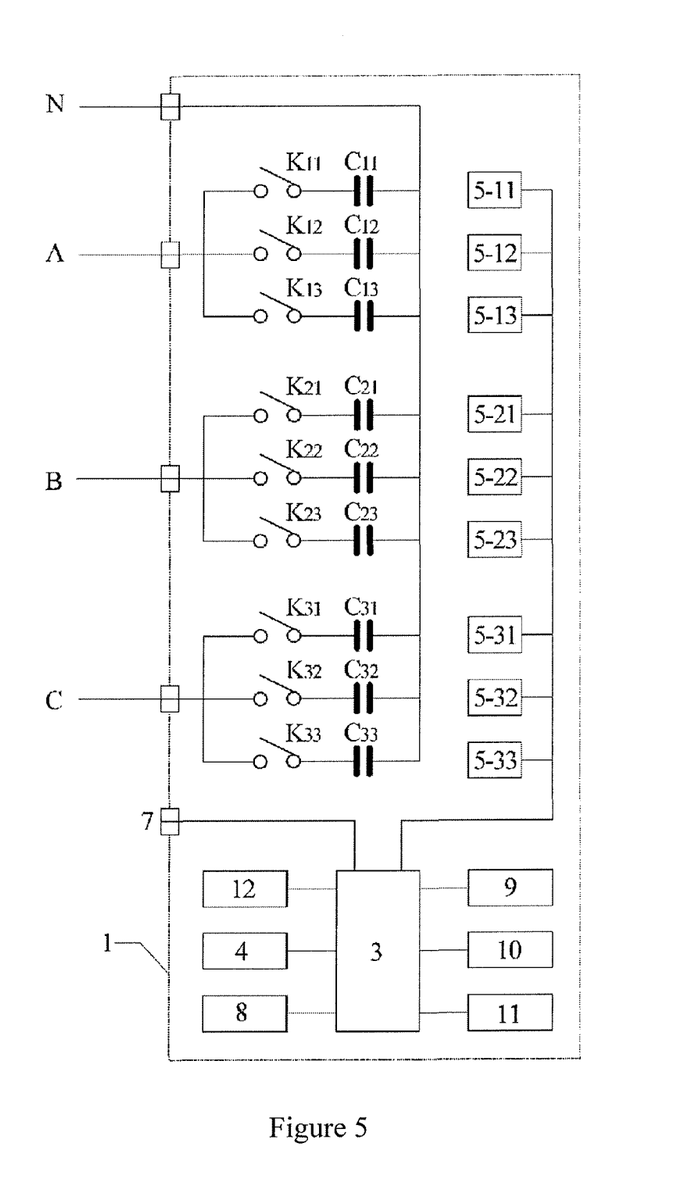
FIG. 5 is a schematic circuit block diagram of an intelligent switch capacitor with multi-level capacitance output according to an embodiment of the present invention.

FIG. 5 is a schematic circuit block diagram of an intelligent switch capacitor with multi-level capacity output according to an embodiment of the present invention. The capacity ratio of C11, C12, and C13 is 1:2:4 in FIG. 5. Different capacities of 1 to 7 levels may be output by controlling the action combinations of the switches K11, K21, and K31, and C21, C22, and C23 and C31, C32, and C33 are also in the same capacity ratio. The embodiment of FIG. 5 can achieve output of different capacities of 1 to 7 levels and can also achieve output of different capacities of three phases by controlling the capacitor switching combinations of the switches K11-K33, so as to fulfill the function of three-phase unbalanced separate phase compensation required by the power grid. If the conventional approach in which the capacitor switch and the capacitor are separated is used, 9 capacitor switches and 9 capacitors are required, so the intelligent switch capacitor with multi-level capacity output according to the embodiment of the present invention has obvious advantages. More capacity outputs can be achieved if one more level of switch groups and capacitor groups is used, which is easy for general designers and will not be described herein again.

Figure 61:
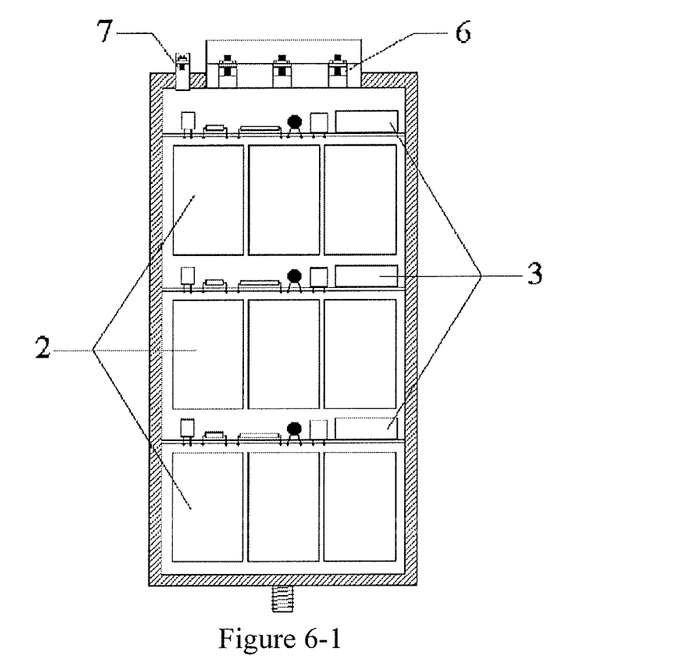
Figure 62:
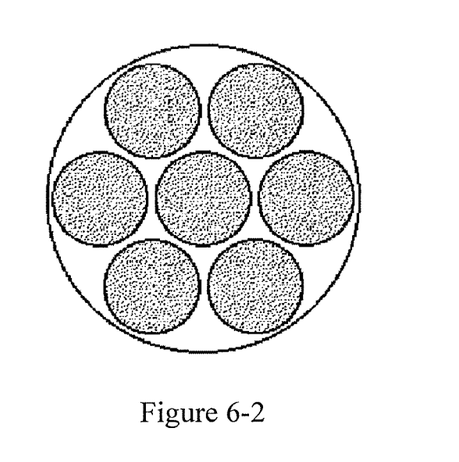

The solution of the intelligent switch capacitor with multi-level capacity output in FIG. 5 can be easily achieved by means of a rectangular housing structure, because a conventional rectangular power capacitor is formed by many small-capacity capacitor cores connected in parallel. If a cylindrical shaped structure is used, a coaxial annular capacitor core structure may be used to achieve multiple capacity outputs. The present invention proposes use of 7 capacitor cores with the same diameter arranged in a hexagon as shown in FIG. 6-2, in which any two cores are connected in parallel and any four cores are connected in parallel so as to achieve 1:2:4 capacity outputs. As shown in FIG. 6-1, a control switch board of each capacitor group may also be placed above the corresponding capacitor group, so that the distance of a wire between a control switch and a controlled capacitor group can be shortened to optimize the structure of the intelligent switch capacitor with multi-level capacity output. The intelligent switch capacitor of the present invention may be made into a structure in which a single capacitor switch controls a single capacitor, that is, into a single-phase intelligent switch capacitor.

In the intelligent switch capacitor of the present invention, in order to reduce power consumption of the control circuit, the main measure taken is to use a capacitive buck rectifier power supply 12 to supply power to the intelligent switch circuit board 3 and use a magnetic latching relay to serve as the capacitor switch 5. In this way, the overall power consumption of the circuit is greatly reduced, and the overall power consumption of the control circuit can be controlled below hundreds of milliwatts, which saves energy and more particularly reduces heat produced by the control circuit in the housing of the capacitor.

Figure 7:
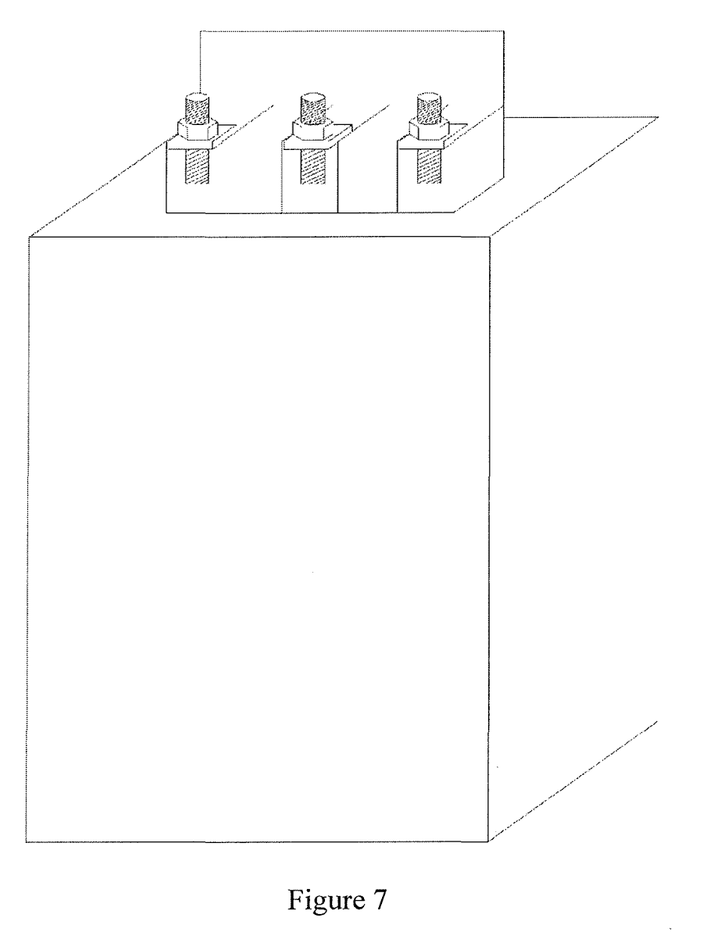
FIG. 7 is an outside reference view I of the intelligent switch capacitor according to the embodiment of the present invention.
Figure 8:
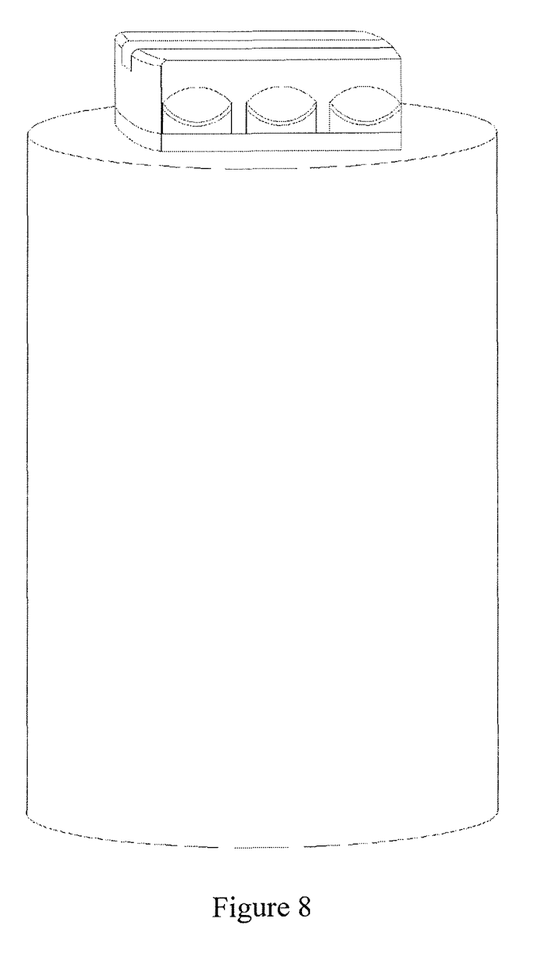
FIG. 8 is an outside reference view II of the intelligent switch capacitor according to the embodiment of the present invention.

As shown in FIG. 7 and FIG. 8, in the intelligent switch capacitor of the present invention, the housing 1 is cube-shaped or cylinder-shaped, and the intelligent switch circuit board 3 can be disposed above the capacitor core 2 irrespective of the shape of the intelligent switch capacitor.

In the embodiments of the intelligent switch capacitor of the present invention, the control interface 7 of the capacitor switch and a reactive compensation controller may be connected in a wired manner or in an infrared or wireless manner.

During use, in function: the temperature sensor 8 on the capacitor core 2 and the temperature measurement module 9 on the intelligent switch circuit board 3 can have an overheating protection function. When the detected temperature is higher than a predetermined value, the intelligent switch circuit board 3 controls the capacitor switch 5 to be disconnected, and the capacitor stops operation and enters a protected state. Such temperature protection is fast, and protection temperature can be set precisely and can be adjusted according to seasonal changes through the control interface 7 of the capacitor switch. Above all such protection is recoverable, that is, the capacitor can operate normally when it does not produce heat; meanwhile, because the capacitor core 2, the intelligent switch circuit board 3, and the capacitor switch 5 are made into a whole, installation is convenient and the reliability of the capacitor is improved. The current measurement module 10 and the current harmonic component measurement module 11 on the intelligent switch circuit board 3 can have a harmonic protection function. When power grid resonance is caused by an excessively high voltage of the power grid, high-order harmonics in the power grid or connection of the capacitor, once the detected current or current harmonic component exceeds a predetermined value, the capacitor switch 5 is cut off so as to ensure that the capacitor core 2 is not subjected to an overcurrent and thus is not burnt out. Moreover, the predetermined value of the overcurrent and the threshold of the harmonic component can be adjusted through the switch control interface 7, and the delay time of the protection action of the capacitor switch can be adjusted. In cost: because the intelligent switch capacitor has the harmonic protection function, a reactor for protection can be omitted, thereby greatly reducing the cost of a compensation device, and because such protection is performed against all harmonics higher than second harmonics, the fatal weakness of unreliable harmonic protection of the reactor is completely eliminated; further, because the thermal protection device, the harmonic protection device, and the switch are integrated, the cost of the switch is greatly reduced.

In energy saving: the intelligent switch capacitor of the present invention enables removal of a discharge resistor connected in parallel to a capacitor terminal while ensuring safety, so that the problem of power consumption of the discharge resistor of the power capacitor is solved. Besides, the intelligent switch circuit board 3 of the intelligent switch capacitor of the present invention adopts a low-power design, and the overall power consumption can be made below hundreds of milliwatts and is far lower than 15 W of a conventional contactor-type capacitor switch. The capacitor switching speed of the intelligent switch capacitor of the present invention can be as high as that of a thyristor while the power consumption of the switch is far lower than that of a capacitor switch of the thyristor.

The present invention is not limited to the aforementioned most preferable implementation manners. Any person can obtain various other forms of products under the teachings of the present invention. All technical solutions identical or similar to the present application shall fall within the protection scope of the present invention irrespective of the changes made to the shape or structure thereof.

The invention claimed is:

1. An intelligent switch capacitor, comprising: a sealed housing, a capacitor core, an intelligent switch circuit board; a single-chip microcomputer, and a capacitor switch, wherein the capacitor core, the intelligent switch circuit board, the single-chip microcomputer and the capacitor switch are disposed inside the sealed housing, a top end of the capacitor core is connected to the intelligent switch circuit board, the single-chip microcomputer and the capacitor switch are connected to the intelligent switch circuit board, the capacitor switch is in an internal triangle connection with the capacitor core; a first leading-out terminal, a second leading-out terminal, a third leading-out terminal and a control interface are disposed in the middle of a top end of the housing, and the control interface is connected to the intelligent switch circuit board, the first leading-out terminal, the second leading-out terminal and the third leading-out terminal are configured to connected to a three-phase power line, and the control interface is configured to control the capacitor switch.

2. The intelligent switch capacitor according to claim 1, wherein a temperature sensor is disposed on the capacitor core.

3. The intelligent switch capacitor according to claim 1, wherein a temperature measurement module, a current measurement module, and a current harmonic component measurement module are disposed on the intelligent switch circuit board.

4. The intelligent switch capacitor according to claim 3, wherein a power module is disposed on the intelligent switch circuit board.

5. The intelligent switch capacitor according to claim 4, wherein the power module is a capacitive buck rectifier power supply.

6. The intelligent switch capacitor according to claim 3, wherein the capacitor switch is a magnetic latching relay.

7. The intelligent switch capacitor according to claim 1, wherein the housing is cube-shaped or cylinder-shaped.

8. The intelligent switch capacitor according to claim 1, further comprising a first switch, a second switch and a third switch, wherein the capacitor switch comprises a first relay, a second relay and a third relay, the capacitor core comprises a first capacitor, a second capacitor and a third capacitor, the first leading-out terminal is electrically connected to a first terminal of the first switch and a first electrode of the first capacitor, the second leading-out terminal is electrically connected to a first terminal of the second switch and a first electrode of the second capacitor, the third leading-out terminal is electrically connected to a first terminal of third switch and a first electrode of the third capacitor, a second terminal of the first switch is electrically connected to a second electrode of the second capacitor, a second terminal of the second switch is electrically connected to a second electrode of the third capacitor, a second terminal of the third switch is electrically connected to a second electrode of the first capacitor.

9. The intelligent switch capacitor according to claim 1, further comprising a fourth leading-out terminal, a first switch, a second switch and a third switch, wherein the capacitor switch comprises a first relay, a second relay and a third relay, the capacitor core comprises a first capacitor, a second capacitor and a third capacitor, the first leading-out terminal is electrically connected to a first terminal of the first switch, a second terminal of the first switch is electrically connected to a first electrode of the first capacitor, the second leading-out terminal is electrically connected to a first terminal of the second switch, a second terminal of the second switch is electrically connected to a first electrode of the second capacitor, the third leading-out terminal is electrically connected to a first terminal of third switch, a second terminal of the third switch is electrically connected to a first electrode of the third capacitor, the fourth leading-out terminal is electrically connected to a second electrode of the first capacitor, a second electrode of the second capacitor and a second electrode of the third capacitor.

10. The intelligent switch capacitor according to claim 9, wherein a capacitance value of the first capacitor is a half of a capacitance value of the second capacitor, and the capacitance value of the second capacitor is a half of a capacitance value of the third capacitor.

11. The intelligent switch capacitor according to claim 1, wherein the capacitor core comprises a first capacitor core, a second capacitor core, a third capacitor core, a fourth capacitor core, a fifth capacitor core, a sixth capacitor core and a seventh capacitor core, the first capacitor core, the second capacitor core, the third capacitor core, the fourth capacitor core, the fifth capacitor core, the sixth capacitor core and the seventh capacitor core have a same diameter and are arranged in a hexagon, the first capacitor core and the second capacitor core are connected in parallel, the third capacitor core, the fourth capacitor core, the fifth capacitor core and the sixth capacitor core are connected in parallel, and the seventh capacitor core is around by the first capacitor core, the second capacitor core, the third capacitor core, the fourth capacitor core, the fifth capacitor core and the sixth capacitor core.

\* \* \* \* \*